United States Patent
Ziaei et al.

(10) Patent No.: US 9,819,065 B2
(45) Date of Patent: Nov. 14, 2017

(54) PASSIVE MICROELECTRONIC COMPONENTS, CAPABLE OF ALLOWING A RADIO-FREQUENCY OR HYPER-FREQUENCY SIGNAL TO TRAVEL IN A SINGLE DIRECTION

(71) Applicant: THALES, Neuilly sur Seine (FR)

(72) Inventors: Afshin Ziaei, Palaiseau (FR); Matthieu Le Baillif, Palaiseau (FR); Shailendra Bansropun, Palaiseau (FR); Paolo Martins, Palaiseau (FR)

(73) Assignee: THALES, Neuilly sur Seine (FR)

( * ) Notice: Subject to any disclaimer, the term of this patent is extended or adjusted under 35 U.S.C. 154(b) by 203 days.

(21) Appl. No.: 14/416,700

(22) PCT Filed: Jul. 23, 2013

(86) PCT No.: PCT/EP2013/065495
§ 371 (c)(1),
(2) Date: Jan. 23, 2015

(87) PCT Pub. No.: WO2014/016285
PCT Pub. Date: Jan. 30, 2014

(65) Prior Publication Data
US 2015/0180108 A1    Jun. 25, 2015

(30) Foreign Application Priority Data
Jul. 23, 2012 (FR) ..................................... 12 02083

(51) Int. Cl.
*H01P 1/38*    (2006.01)
*H01G 4/33*    (2006.01)
(Continued)

(52) U.S. Cl.
CPC ................. *H01P 1/38* (2013.01); *H01G 4/33* (2013.01); *H01P 1/387* (2013.01); *H01P 3/003* (2013.01);
(Continued)

(58) Field of Classification Search
CPC ............ H01P 3/003; H01P 3/082; H01G 4/33
(Continued)

(56) References Cited

U.S. PATENT DOCUMENTS 8,120,443 B2   2/2012   Ziaei
8,155,602 B2   4/2012   Ziaei et al.
(Continued)

FOREIGN PATENT DOCUMENTS

EP   2 110 881    10/2009
FR   2901917     12/2007

OTHER PUBLICATIONS

International Search Report dated Feb. 7, 2014, which issued during prosecution of International Application No. PCT/EP2013/065495, which corresponds to the present application.
(Continued)

*Primary Examiner* — Stephen E Jones
(74) *Attorney, Agent, or Firm* — Troutman Sanders LLP

(57) ABSTRACT

A passive radiofrequency microelectronic components for an integrated circuit which includes a dielectric substrate and at least one metal conductive layer positioned on said substrate. The conductive layer including at least one first metal conductive portion and a second metal conductive portion separated by an insulation. A microelectronic component according to the invention includes at least one graphene layer positioned so that a radiofrequency or hyperfrequency signal crosses said at least one graphene layer when it is transmitted between said first metal conductive portion and said second metal conductive portion, said
(Continued)

graphene layer being able, when it is subject to an electric potential, to transmit said radiofrequency or hyperfrequency signal along a first direction and to attenuate said radiofrequency or hyperfrequency signal along a second direction opposite to said first direction.

4 Claims, 4 Drawing Sheets

(51) Int. Cl.
*H01P 1/387* (2006.01)
*H01P 3/00* (2006.01)
*H01P 3/08* (2006.01)
H01G 4/018 (2006.01)
H01H 1/00 (2006.01)

(52) U.S. Cl.
CPC ............ *H01P 3/082* (2013.01); *H01G 4/018* (2013.01); *H01H 1/0036* (2013.01); *H01H 2300/036* (2013.01)

(58) Field of Classification Search
USPC ........................... 333/24.2, 81 A, 81 R, 22 R
See application file for complete search history.

(56) References Cited

U.S. PATENT DOCUMENTS

| 2005/0083635 A1* | 4/2005 | Ooma ................... B82Y 10/00 |
| | | 361/305 |
| 2007/0158768 A1 | 7/2007 | Pilchowski et al. |
| 2009/0237173 A1 | 9/2009 | Ziaei |
| 2009/0286491 A1 | 11/2009 | Ziaei et al. |
| 2012/0146743 A1 | 6/2012 | Ermolov |

OTHER PUBLICATIONS

Hierold, et al. "CNT based Nano Electro Mechanical Systems (NEMS)" Micro-Nanomechatronics and Human Science, 2005 IEEE International Symposium, Nov. 7, 2005, pp. 1-4.
Sounas, et al. "Graphene-based Non-reciprocal Spatial Isolator" Antennas and Propagation (APSURSI), 2011 IEEE International Symposium, Jul. 3, 2011, pp. 1597-1600.
Xu, et al. "Electrical Characteristics of Graphene for Nano-sized Coplanar Waveguide" 2011 Cross Strait Quad-Regional Radio Science and Wireless Technology Conference, Jul. 26, 2011, pp. 701-704.
Written Opinion of the International Searching Authority dated Feb. 7, 2014, which issued during prosecution of International Application No. PCT/EP2013/065495, which corresponds to the present application.

* cited by examiner

PASSIVE MICROELECTRONIC COMPONENTS, CAPABLE OF ALLOWING A RADIO-FREQUENCY OR HYPER-FREQUENCY SIGNAL TO TRAVEL IN A SINGLE DIRECTION

CROSS REFERENCE TO RELATED APPLICATIONS

This application is a U.S. National Phase Application under 35 U.S.C. §371 of International Patent Application PCT/EP2013/065495 filed Jul. 23, 2013 which claims priority to French Patent Application 12 02 083 filed Jul. 23, 2012. The International Application was published on Jan. 30, 2014, as International Publication No. WO 2014/016285 under PCT Article 21(2). The entire contents of these applications are hereby incorporated by reference.

FIELD OF THE INVENTION

The present invention relates to passive microelectronic components, capable of allowing a radiofrequency or hyperfrequency signal to travel along a single direction.

The invention is located in the general field of microelectronic components for an integrated circuit, and finds applications in radiofrequency or hyperfrequency telecommunications systems such as radar or wireless telephone systems.

BACKGROUND

Generally, radiofrequency or hyperfrequency components of the ohmic or capacitive type, do not have any particular associated direction of transmission. Thus for example a transmission line of the micro-strip type according to the state of the art, may equally be connected between an input radiofrequency line from a radiofrequency source and an output radiofrequency line.

For certain applications, it is important that the radiofrequency or hyperfrequency signal cannot return to the source from which it stems.

In order to meet this need, radiofrequency components called radiofrequency circulators have been developed. A radiofrequency circulator is a device with n ports, allowing a radiofrequency signal to only travel along a given direction, a so-called circulation direction, between an input port and an output port. The radiofrequency signal is almost transmitted without any losses in the circulation direction, and the reflected waves are strongly attenuated. This property is also called non-reciprocity of transmission of the component.

Circulators using a ferrite and permanent magnet structure imposing an electromagnetic gyration direction have been proposed in the state of the art, but this type of circulator has the drawback of being cumbersome and costly.

Alternatively, patent application FR 06 04857 describes a radiofrequency or hyperfrequency circulator based on micro-switches, which considerably reduces its size. Nevertheless, even by using the technology described in this document, it is necessary to manufacture a specific circulator component in order to obtain the non-reciprocity property.

OBJECTS AND SUMMARY OF THE INVENTION

It is therefore desirable to obtain radiofrequency components having the non-reciprocity property at a lower manufacturing cost, while retaining a small size.

For this purpose, the invention proposes a passive radiofrequency microelectronic component for an integrated circuit including a dielectric substrate and at least one metal conductive layer positioned on said substrate, said conductive layer including at least one first metal conductive portion and a second metal conductive portion separated by isolation.

The passive radiofrequency microelectronic component according to the invention includes at least one graphene layer positioned so that a radiofrequency or hyperfrequency signal crosses said at least one graphene layer when it is transmitted between said first metal conductive portion and said second metal conductive portion, said graphene layer being capable, when it is subject to an electric potential, of transmitting said radiofrequency or hyperfrequency signal along a first direction and of attenuating said radiofrequency or hyperfrequency signal along a second direction opposite to said first direction.

Advantageously, the invention proposes the utilisation of the electromagnetic polarization properties of a radiofrequency or hyperfrequency signal with a graphene layer in order to make various passive radiofrequency microelectronic components capable of transmitting a radiofrequency or hyperfrequency signal along a preferred direction.

Indeed, graphene is a mono-planar two-dimensional crystal of carbon, the stacking of which makes up the graphite. It was shown that a single layer of graphene has good electric conductivity and a property of polarization of an electromagnetic field through the layer, the angle of rotation associated with the polarization being dependent on an electric potential applied to the graphene layer. Thus, the direction and the intensity of the polarization determine a preferential transmission direction of the radiofrequency or hyperfrequency signal and therefore an attenuation direction of the latter.

Advantageously, one or several graphene layers are easy to integrate into a method for manufacturing a microelectronic component.

The passive microelectronic component according to the invention may also have one or several of the features below:
- when it is of the transmission line type, said at least one graphene layer is positioned in contact with the first metal conductive portion and connected to the second metal conductive portion via a metal bridge;
- when it is of the capacitive type including a dielectric layer covering at least partly said first metal conductive portion and in contact with said second metal conductive portion, said at least one graphene layer is positioned in contact with said dielectric layer;
- when it is of the capacitive type as mentioned above, said at least one graphene layer is positioned between said first metal conductive portion and the dielectric layer;
- when it is of the capacitive type as mentioned above, said at least one graphene layer is positioned between said second metal conductive portion and the dielectric layer;
- when it is of the capacitive type as mentioned above, it includes a plurality of alternating dielectric and graphene layers;
- when it is of the micro-switch type comprising a flexible metal membrane able to establish a contact between said first metal conductive portion and said second metal conductive portion, the first metal conductive portion being covered with a dielectric layer, said graphene layer is positioned in contact with said dielectric layer;

when it is of the micro-switch type as mentioned above, it includes a plurality of alternating dielectric and graphene layers;

when it is of the capacitive type or of the micro-switch type, the graphene layer(s) is(are) of the same dimensions in width and in length as said dielectric layer;

the graphene layer consists of a sheet of carbon crystals with mono-atomic thickness.

BRIEF DESCRIPTION OF THE DRAWINGS

Other features and advantages of the invention will become apparent from the description which is given thereof below, as an indication and by no means as a limitation, with reference to the appended figures, wherein.

DETAILED DESCRIPTION

The principle of the invention consists of adding one or several graphene layers in a passive microelectronic component of the ohmic or capacitive type, the graphene layers being positioned so as to utilise the polarization property of graphene for making the microelectronic component non-reciprocal, therefore allowing transfer along one direction and not allowing transfer along the opposite direction.

The invention will be described in its application to various passive microelectronic components which are transmission lines, capacitors and micro-switches.

Figure 1:
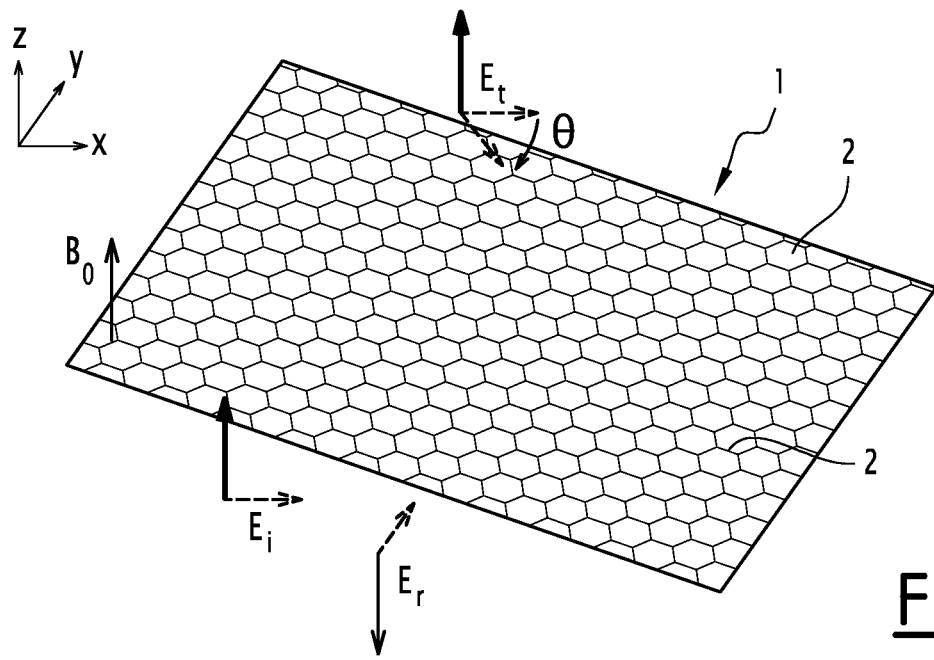
FIG. 1 represents a graphene sheet and illustrates the polarization property of graphene.

FIG. 1 illustrates a graphene sheet 1 consisting of hexagonal carbon crystals 2, with single-atom thickness. The components of the electric field E and magnetic field B are illustrated in a three-dimensional reference system (x, y, z), in order to illustrate the rotation of the electric field upon transfer of a radiofrequency or hyperfrequency signal through the graphene sheet 1, when it is polarized by applying an electric potential. Depending on the electric potential level applied at the graphene layer 1, the component Ei of the electric field undergoes rotation by an angle of θ.

The polarization angle and the polarization intensity, depending on the potential level applied to the graphene sheet, determine a preferential transmission direction and generate the non-reciprocity phenomenon, according to which the transmission in the direction opposite to the preferential direction is strongly attenuated by losses.

Figure 9:
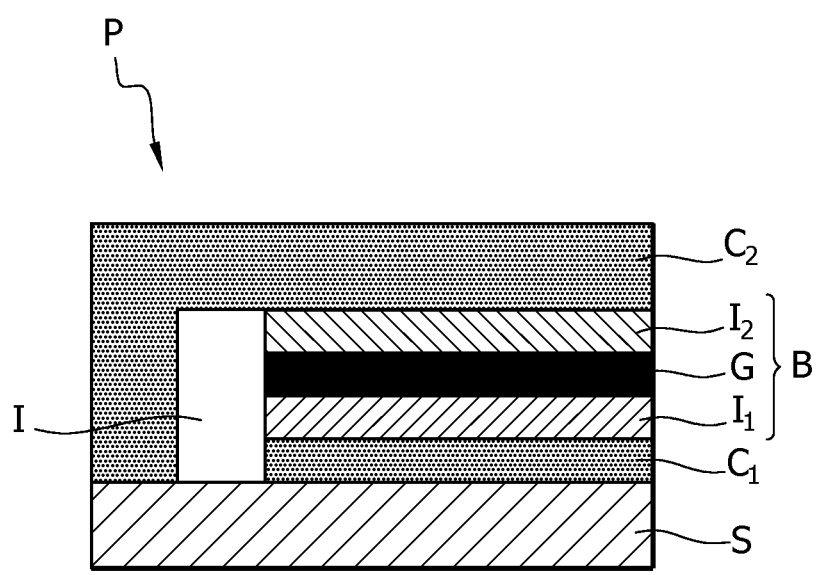
FIG. 9 illustrates a non-reciprocal micro-electronic component portion according to the invention.

FIG. 9 illustrates a portion P of a passive microelectronic component for an integrated circuit according to the invention.

The portion P, which is illustrated as a section, comprises a dielectric substrate S, a first metal conductive portion C1 and a second metal conductive portion C2. The first metal conductive portion C1 is laid on the substrate S. The conductive portions C1 and C2 are separated by an insulation cut I, which in practice is a free space.

According to the principle of the invention, one or several sets B of additional layers are added in the insulation space I, between the metal conductive portions C1 and C2. The set B comprises at least one graphene layer G. It may also comprise a first intermediate layer $I_1$, for example a dielectric layer, positioned under the graphene layer G and an intermediate layer $I_2$, positioned above the graphene layer. The intermediate layers $I_1$ and $I_2$ are optional, according to the contemplated embodiment, as described hereafter.

Thus, at least one graphene layer is positioned between the metal conductive portions C1 and C2.

Any passive micro-electronic component integrating a portion P as described above becomes non-reciprocal. Indeed, the added graphene layer G is able to transmit a radiofrequency or hyperfrequency signal transmitted between the first conductive portion C1 and the second conductive portion C2 along a first direction and to attenuate it along a second direction, opposite to the first direction.

The use of a microelectronic component portion as described above in diverse passive microelectronic components which are transmission lines, capacitors and micro-switches, will be described in more detail.

Figure 2:
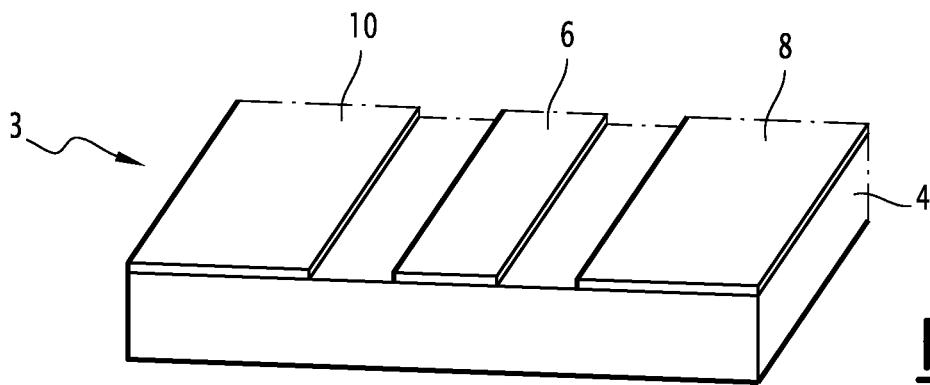
FIG. 2 is an example of a transmission line of the coplanar type.

FIG. 2 illustrates a transmission line of the coplanar line type 3 according to the state of the art, widely used in integrated circuits, consisting of a dielectric substrate 4, of a conductive micro-strip 6, and of two ground planes 8, 10, located on the same face of the component as the micro-strip.

Figure 3:
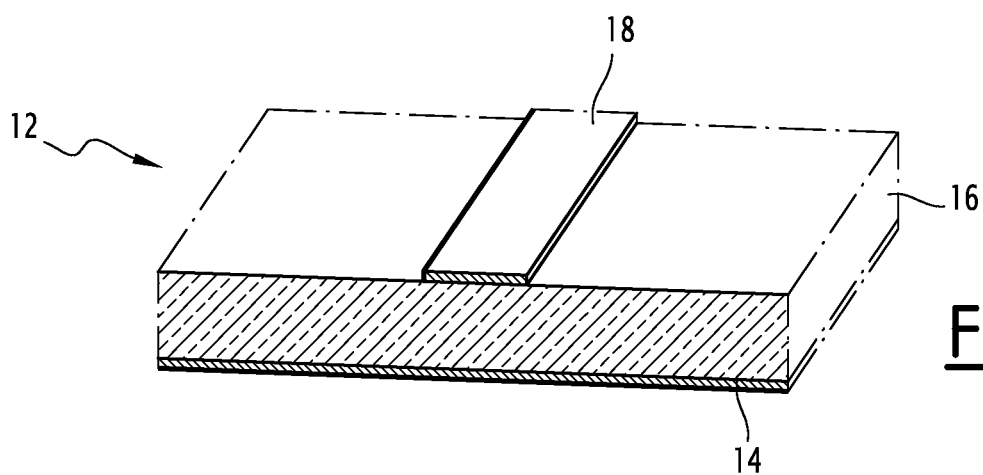
FIG. 3 is an example of a transmission line of the micro-strip type.

FIG. 3 illustrates a transmission line of the micro-strip line type 12, also widely used in integrated circuits, including a ground plane 14, a dielectric substrate 16 and a conductive strip 18.

These transmission lines 3, 12 are able to be connected between an input radiofrequency line, a so-called source and an output radiofrequency line, a so-called load, not shown in the figures, and to transmit a radiofrequency or hyperfrequency signal between the source and the load.

Figure 4:
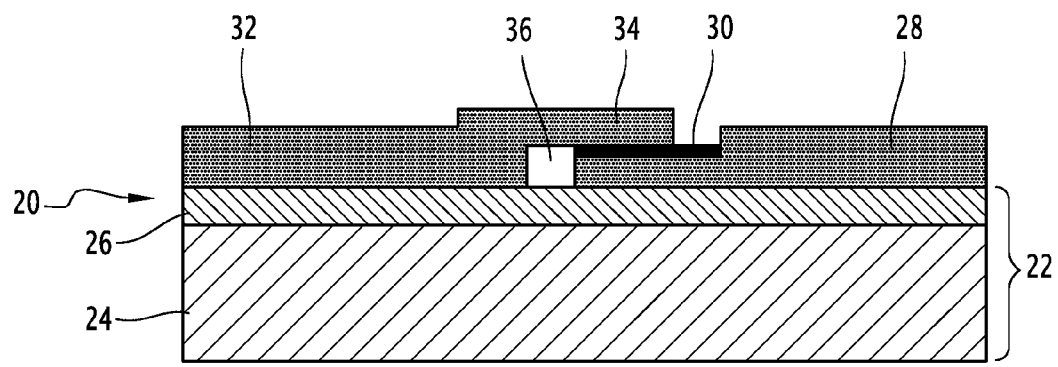
FIG. 4 is a longitudinal sectional view of a non-reciprocal transmission line according to an embodiment of the invention.

In order to make these transmission lines 3, 12 non-reciprocal, by establishing a first preferential transmission direction and a second strongly attenuated transmission direction, the second direction being opposite to the first direction, one or several graphene layers are inserted in series as illustrated in FIG. 4, which illustrates a longitudinal sectional view of the central line of a coplanar transmission line 3. A graphene layer consists of one or several superposed graphene sheets 1.

An analogous embodiment is applied with the transmission line of the micro-strip type 12.

In the sectional view 20 of the transmission line 3, the stacking of thin layers is illustrated forming the central portion of the transmission line. The substrate 22, corresponding to the substrate of FIG. 2, consists in this embodiment of a first passivation layer 24 and a second passivation layer 26, superposed to the layer 24. For example, the layer 24 is in high resistivity silicon and the layer 26 is in silicon dioxide (silica). A first metal conductive portion 28, being part of the conductive micro-strip 6, is laid on the substrate.

A graphene layer 30 consisting of a graphene sheet partly covers the first metal conductive portion 28.

Alternatively, the layer 30 consists of several superposed graphene sheets, in order to increase the polarization effect and the non-reciprocity effect of the transmission which results from this.

The graphene layer 30 is in contact with a second metal conductive portion 32 being part of the conductive microstrip 6, via a bridge 34 which extends the conductive portion 32 and partly covers the graphene sheet 30.

The conductive portions 28, 32 are separated by an insulation cut 36, which separates both metal portions.

In an embodiment, the metal portions 28 and 32 are in a conductive metal, typically gold (Au).

When a potential is applied to the graphene layer 30 through electrodes not shown in FIG. 4, it is polarized, which has the effect as explained above of defining a preferential transmission direction of a radiofrequency or hyperfrequency signal.

Figure 5:
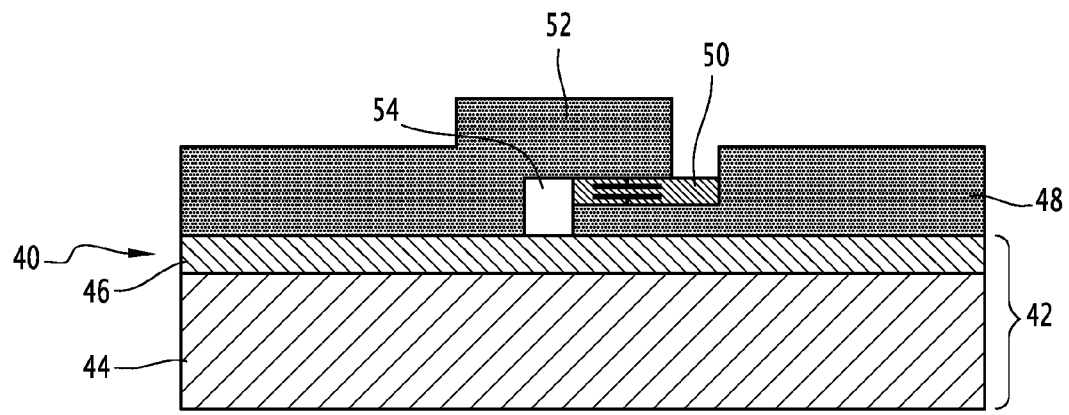
FIG. 5 is a sectional view of a capacitance of the MIM type.

FIG. 5 illustrates, in a cross section, another passive microelectronic component which is a capacitor of the Metal-Insulator-Metal (MIM) type.

The capacitor 40 comprises a substrate 42, consisting in this embodiment of a first passivation layer 44 and of a second passivation layer 46, superposed to the layer 44. These substrate layers are similar to the substrates already described with reference to FIGS. 2 and 3 for transmission lines.

The capacitor 40 also includes a first metal conductive portion which is a metal layer 48, a dielectric layer 50 and a second metal conductive portion which is a metal layer 52. Both metal layers 48, 52 form the plates of the capacitor 40. The dielectric layer 50 is in contact, on a portion of its surface, with a portion of the first layer 48 and on another portion of its surface, with a portion of the second metal layer 52. An insulation cut 54 is made between the first metal conductive layer 48 and the second metal conductive layer 52, over the whole thickness so as to form an insulation and to obtain the capacitive effect through the dielectric 50.

The dielectric 50 for example consists in a non-limiting way, of silicon oxide ($SiO_2$) or of silicon nitride ($Si_3N_4$). Alternatively, any other known dielectric material may be used.

The metal portions 48, 52 are in a conductive metal, typically in gold (Au).

The manufacturing of such a capacitive component is achieved with known techniques such as for example epitaxy or growth of layers.

Figure 6:
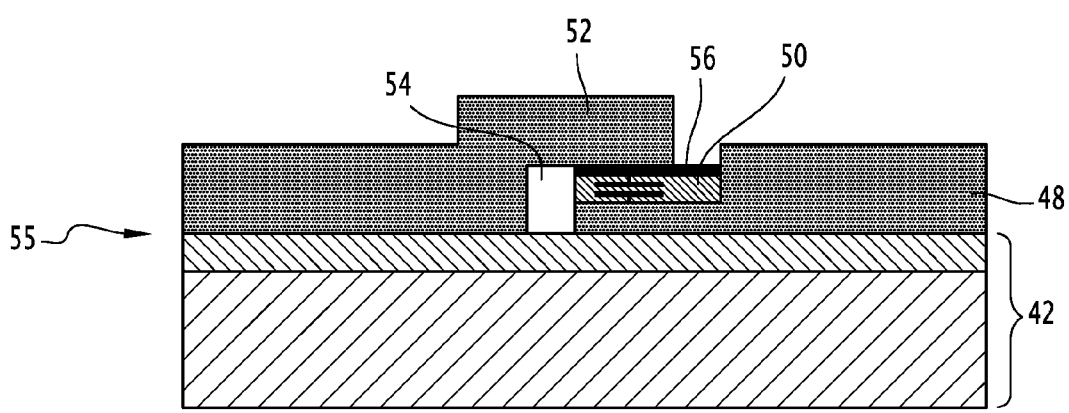
FIG. 6 is a sectional view of a non-reciprocal capacitance MIM according to an embodiment of the invention.

Advantageously, it is easy to integrate into such manufacturing methods, the addition of one or several graphene layers in order to produce a non-reciprocal capacitive component according to the invention, an example of which is illustrated in a sectional view in FIG. 6. Indeed, a graphene layer is for example made by epitaxy from silicon carbide.

A non-reciprocal capacitive component 55 according to the invention illustrated as a sectional view in FIG. 6, includes, in addition to the elements already described for a standard capacitive component, one or several graphene layers 56, positioned in contact with the dielectric 50.

Preferably, the graphene layer is positioned as a "sandwich" relatively to the dielectric layer 50, and is located either above the dielectric layer as illustrated in FIG. 6, or below it.

In the alternative case when several graphene layers are provided, they are for example positioned in alternation with dielectric layers. Advantageously, by inserting several graphene layers it is possible to increase the non-reciprocity effect of the component when they are polarized by applying an electric potential. The graphene layers are either connected to a same potential source, or each connected to a separate potential source. The various stacked layers are made in succession. For example, when a graphene layer is added to the middle of the dielectric layer, five manufacturing steps are applied for respectively making the (metal, dielectric, graphene, dielectric, metal) layers of the component.

Preferably, the graphene layer has the same dimensions in length and in width as the dielectric layer 50.

Similarly, it is possible to make a capacitor of the non-reciprocal interdigitated capacitance type, by applying one or several graphene sheets overlapping each other on the fingers of one or two combs positioned facing each other. Similarly to the embodiment of the MIM capacitor explained above, with reference to FIG. 6, the graphene layer(s) is(are) then in contact with the dielectric which is air in this scenario and give the possibility of promoting the transmission of a radiofrequency or hyperfrequency signal along a given direction when they are polarized by applying a potential.

Figure 7:
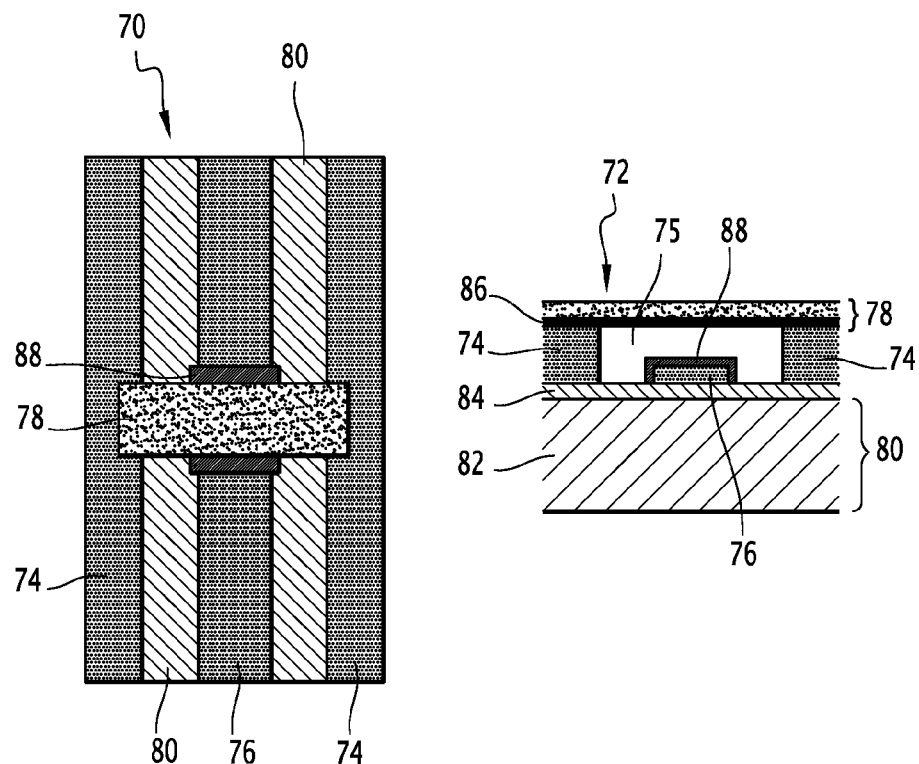
FIG. 7 is a top view and a sectional view of a micro-switch.

FIG. 7 illustrates another passive component which may be made non-reciprocal according to the invention, which is a MEMS (Microelectromechanical System) radiofrequency or hyperfrequency micro-switch.

FIG. 7 illustrates a top view 70 and a cross sectional view 72 of an MEMS micro-switch, which produces a switching function via a deformable metal membrane, in contact with conductive portions insulated from each other, the membrane will establish a contact when it is subject to a potential difference.

As illustrated in FIG. 7, the metal conductive portions or layers 74 are insulated from each other, separated by an empty space 75, the air playing the role of an insulator. A first conductive metal portion or central metal contact 76 allows a short circuit to be made when a membrane 78 is in the low state. The conductive layers 74, 76 are affixed on a substrate 80, preferentially including two layers, a first passivation layer 82 and a second passivation layer 84, superposed to the layer 82, as explained above with reference to the other described passive components.

The membrane 78 is connected to the ground plane through a contact 86.

A dielectric layer 88 is positioned above the central metal contact 76.

When the MEMS switch is actuated, the membrane 78 is lowered and laid on the dielectric 88 and thus forms a capacitive contact between the contact 76 and the ground plane via the contact 86. This configuration is similar to the configuration of the MIM capacitor described above with reference to FIGS. 5 and 6, the function of the second metal layer being achieved with the metal membrane 78 in the lowered state.

Conventionally, the membrane 78 is in a conductive metal, typically gold (Au).

Figure 8:
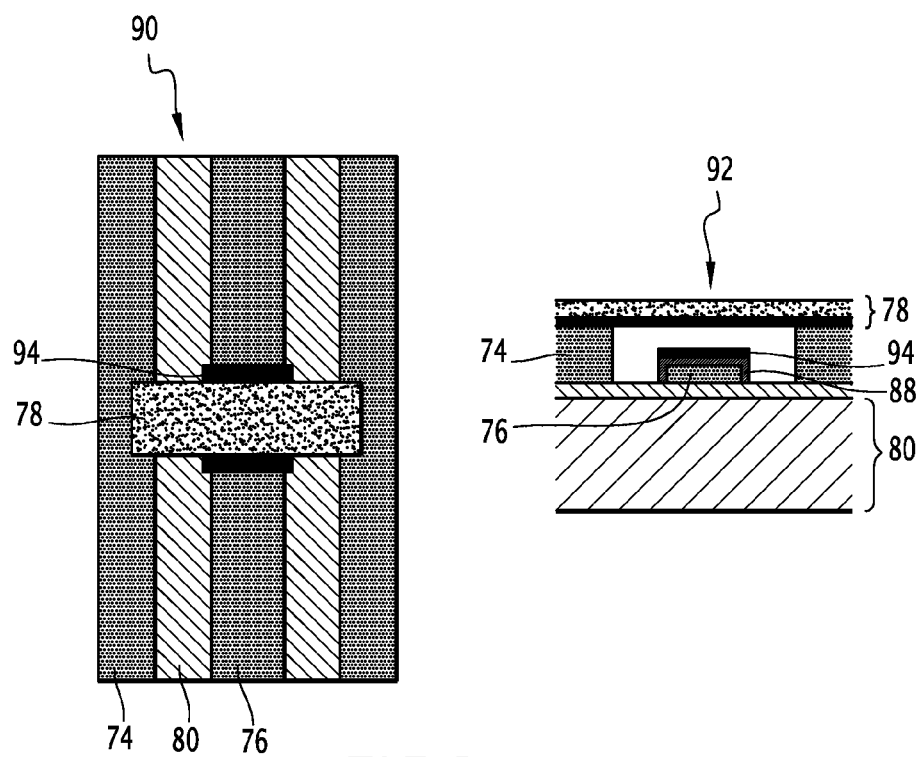
FIG. 8 is a top view and a sectional view of a non-reciprocal micro-switch according to an embodiment of the invention.

FIG. 8 illustrates, in a top view 90 and in a cross sectional view 92 a micro-switch of the type of the one of FIG. 7 improved by adding a graphene layer.

The references of FIG. 7 are repeated for designating the same elements. In addition to the elements of the MEMS micro-switch of FIG. 7, a graphene layer 94 is added in contact with the dielectric 88.

In the embodiment illustrated in FIG. 8, the graphene layer is positioned above the dielectric 88 and has the same dimensions.

In an alternative embodiment, the graphene layer 94, formed with one or several graphene sheets, is laid above the electric contact and below the dielectric 88.

In another alternative embodiment, superposition of several alternating dielectric and graphene layers is achieved.

Advantageously, by means of a graphene layer or of a plurality of graphene layers, the coupling between the contact 86 and the ground plane is made non-reciprocal, and consequently the insulation is improved and the power is no longer reflected on the ground plane, it is absorbed. Thus, the switching capability of this component is increased.

Likewise the addition of one or several graphene layers in a capacitive MEMS switch of the series type is contemplated.

Advantageously, the passive microelectronic components described above are made non-reciprocal by adding one or several graphene layers. The bulkiness of these microelectronic components remains low, in so far that one or several graphene layers have a very small thickness. The obtained non-reciprocal components have dimensions similar to the dimensions of standard components which do not have any preferred direction of circulation of the radiofrequency or hyperfrequency signal.

The manufacturing of passive microelectronic components with addition of one or several graphene layers is easy, since it simply includes the addition of additional layers in the stack of layers making up such components.

The invention claimed is:

1. A passive radiofrequency microelectronic component for an integrated circuit forming a micro-switch comprising a dielectric substrate and at least one metal conductive layer positioned on said substrate, said conductive layer including at least one first metal conductive portion and a second metal conductive portion separated by an insulation, comprising:
   at least one graphene layer positioned so that a radiofrequency or hyperfrequency signal crosses said at least one graphene layer when it is transmitted between said first metal conductive portion and said second metal conductive portion, said graphene layer being able, when it is subject to an electric potential, to transmit said radiofrequency or hyperfrequency signal along a first direction and to attenuate said radiofrequency or hyperfrequency signal according to a second direction opposite to said first direction; and
   a flexible metal membrane able to establish contact in said first metal conductive portion and said second metal conductive portion, the first metal conductive portion being covered with a dielectric layer,
   wherein said graphene layer is positioned in contact with said dielectric layer.

2. The radiofrequency microelectronic component according to claim 1, comprising a plurality of alternating dielectric and graphene layers.

3. The radiofrequency microelectronic component according to claim 1, wherein a said graphene layer consists of a sheet of carbon crystals with a mono-atomic thickness.

4. The radiofrequency micro-electronic component according to claim 1, wherein said graphene layer is of the same dimensions in width and in length as said dielectric layer.

* * * * *